United States Patent Office 2,854,486
Patented Sept. 30, 1958

2,854,486

2 - ALKENOXYMETHYL - 2 - METHYL - 1,3 - PROPANEDIOLS

Herbert F. McShane, Jr., Wilmington, Del., assignor to E. I. du Pont de Nemours and Company, Wilmington, Del., a corporation of Delaware No Drawing. Application July 2, 1956
Serial No. 595,136

5 Claims. (Cl. 260—615)

This invention relates to unsaturated glycols which are useful in the preparation of sulfur-curable polyurethane elastomers.

In the early development of polyurethane elastomers derived from the reaction of macromolecular glycols with organic diisocyanates, the principal method of curing has been through the use of additional polyisocyanate which cross-linked the polymer by reaction with the active hydrogen atoms on the polyurethane. Difficulty was encountered in this method since the polyisocyanates tended to react too fast and cause premature curing during the processing of the elastomer. This characteristic is a definite obstacle to commercial acceptance for many uses.

It has been found that if pendant unsaturated groups can be introduced into the polymer, sulfur curing can be adapted. In such cases, premature curing, or scorching, is avoided. It has further been found that the pendant group may readily be incorporated into the elastomer by adding a low molecular weight glycol having a side chain bearing an ethylenically unsaturated group to the reaction of the macro glycol with the organic diisocyanate. This yields a polyurethane in which the diisocyanates act as bridging means for connecting the macro glycols and the low molecular weight glycols to form a polymeric polyurethane.

It is an object of this invention to provide a new class of glycols having unsaturated side chains which are of particular value in preparing sulfur-curable polyurethanes.

It is a further object of the present invention to effect a satisfactory curing rate for polyurethane elastomers derived from the reaction of macromolecular glycols with organic diisocyanates.

More specifically the present invention relates to the preparation of a new class of glycols having pendant unsaturated groups which can be introduced into polyurethane elastomers to enable adaptation to sulfur curing.

The unsaturated glycol ethers of this invention have the general formula

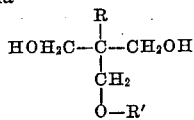

wherein R is a lower alkyl radical, R' is an aliphatic radical of from 3 to 11 carbon atoms, said radical having a terminal C=C double bond, said double bond being hydrogen substituted.

In the above formula, R is a lower alkyl radical having from 1 to 4 carbon atoms, depending on the specific trimethylol compound utilized; the aliphatic group in this formula, the radical R', is a simple olefinic hydrocarbon radical which may have hetero-atoms (such as oxygen) in the group. The double bond of the R' radical is in the terminal position and substituted only with hydrogen; said radical may have from 3 to 11 carbon atoms; representative radicals within this range are set forth specifically in the examples which follow. The glycols of the present invention may be prepared according to the following general scheme:

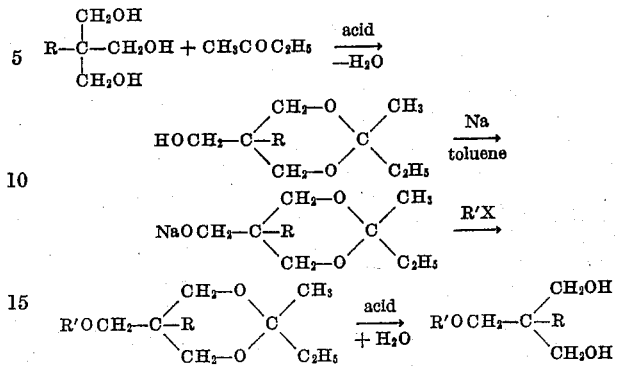

wherein R and R' are as above defined and X is either chlorine, bromine or iodine. One alternate method of preparation of the unsaturated glycols of the present invention is disclosed in Example 4.

The unsaturated glycols of this invention are ethers of the described trimethylol compounds in which the ethylene C=C unsaturation occurs in the group attached to the ether oxygen. The ether group is formed from a primary alcohol group. This class of ethers has several advantages over ethers which are formed from secondary alcohol groups; they have appreciably better resistance to degradation under oxidizing conditions; they have much better resistance to acid hydrolysis; and furthermore, since they have a 1,3-glycol structure, they are much less prone to undergo rearrangement than those with a 1,2-glycol structure such as alpha-ethers of glycerol.

The unsaturated glycols of the present invention are particularly useful in preparing polyurethanes containing polyalkyleneether radicals derived from polyalkyleneether glycols of molecular weight at least 750. For example, one mol of the unsaturated glycol may be reacted with 2 or more mols of a diisocyanate to form a diurethane having terminal —NCO groups. This may then be reacted with a quantity of polyalkyleneether glycol sufficient to furnish one —OH group for each —NCO group to form a polyurethane having unsaturated side chains along its length. The polyurethane may be compounded with sulfur-vulcanizing ingredients and cured by heating. The number of side chains along the backbone of the polymeric polyurethane may be varied by controlling the ratio of the number of mols of unsaturated glycol to the number of mols of polyalkyleneether glycol, the organic diisocyanate always being sufficient to react with all the —OH groups.

The preferred polyalkyleneether glycol is polytetramethyleneether glycol of molecular weight 750–2000 and the preferred organic diisocyanate is toluene-2,4-diisocyanate. The unsaturated glycols of this invention give elastomers with the preferred constituents which have particularly good thermal stability. The elastomers retain their form and elastic properties under heat conditions which cause failure in elastomers made with certain other types of unsaturated glycols.

Another alternate route for the preparation of the glycol ethers of the present invention is represented by the scheme which follows:

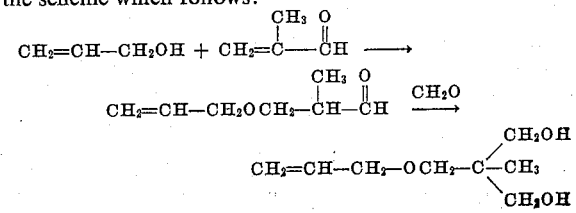

3

In the present invention, as represented by the following examples, the radical R may be methyl or ethyl, by using the appropriate trimethylol compound instead of trimethylol ethane.

EXAMPLES

Sodium salt of hydroxy ketal 1000 parts of trimethylolethane, 1000 parts of methylethyl ketone, 400 parts of benzene and 2 parts of p-toluene sulfonic acid are placed in an agitated vessel equipped with a fractionating column and a water separator and refluxed for 40 hours during which time the theoretical amount of water is removed to form the corresponding hydroxy ketal.

2 parts of sodium acetate are then added while refluxing is continued an additional 30 minutes. The water separator is replaced with a fractionating head and the solvents are distilled off and then the hydroxy ketal is distilled over a 14 mm. of mercury pressure at 125° C.

The ketal has the formula

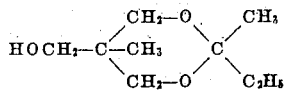

It has a refractive index $n_D^{25}$ 1.4559.

The sodium salt of the hydroxy ketal is prepared by dispersing 82 parts of sodium in 400 parts of toluene by rapid stirring at 110° C. under an atmosphere of nitrogen and then adding gradually over a period of about 20 minutes 620 parts of the hydroxy ketal. The rather violent exothermic reaction supplies enough heat to maintain the toluene at the reflux. After the addition is complete, refluxing is continued for about 10 minutes by applying heat. The product is a light yellow liquid which does not freeze when cooled to 70° C.

EXAMPLE 1

To the solution of sodium salt of the hydroxy ketal prepared above is added 445 parts of allyl bromide over a period of 25 minutes at a temperature ranging from 119° C. at the start to 127° C. at the end, the toluene being at the reflux. Refluxing is then continued for an hour. The mass is cooled to 50° C., 500 parts of water is stirred in, and then the layers are allowed to separate. The toluene layer is recovered, dried and fractionated. The allyloxy ketal boils at 113° C. at 14 mm. of mercury pressure and has a refractive index $n_D^{25}$ 1.4452. Analysis shows C=67.7%, H=10.5%.

To 225 parts of the ketal (2-methyl-2-ethyl-5-allyloxymethyl-5-methyl-1,3-dioxane) is added 0.2 parts of p-toluene sulfonic acid and 50 parts of water. The mass is stirred and heated to the boil and becomes homogeneous. The theoretical amount of methylethyl ketone-water azeotrope is distilled off. The mass is cooled, 0.2 part of sodium acetate is added and the glycol is distilled off. The 2-[allyloxymethyl]-2-methyl-1,3 - propanediol boils at 140° C. at 13 mm. of mercury pressure. It has a refractive index $n_D^{25}$ 1.4628. Analysis shows: C= 59.85%, H=10.2%, OH # 701.

EXAMPLE 2

28.8 parts of pyridine is added slowly to 504 parts of phosphorus tribromide in an agitated, cooled vessel. The mixture is then cooled to —5° C. and a mixture of 433 parts of 4-penten-1-ol (Org. Syn. vol. 25, p. 84) and 79.2 parts of pyridine is added slowly over a period of one hour, the temperature in the vessel being maintained at —50 C. The temperature is then raised to 25° C. and the mass stirred for two hours. The mass is then distilled, the distillate washed with water, dried and then fractionated. 466 parts of 5-bromo-1-pentene boiling at 126.5° C. at 760 mm. of mercury is obtained. Analysis: Found: C=40.25%, H=6.1%, Br=53.2%.

548 parts of 5-bromo-1-pentene prepared as above is added to a duplicate preparation of the sodium salt of the hydroxy ketal over a period of about 50 hours while maintaining the mass at the reflux temperature, from 119 to 127° C. After the refluxing, the mass is cooled to about 50° C. and 200 parts of water is stirred in. The mass is allowed to stand for layers to separate. The toluene layer is recovered, dried and distilled. The pentenyloxy ketal boils at 138° C. at 15 mm. of mercury pressure and has a refractive index $n_D^{25}$ 1.4463. Analysis shows: C=69.15%, H=10.65%.

255 parts of the pentenyloxy ketal (2-methyl-2-ethyl-5-methyl-5-[4 - (pentenyloxy)methyl] - 1,3 - dioxane) 50 parts of water and 0.2 part of p-toluene sulfonic acid are stirred and heated to the boil. The mass becomes homogeneous and the methylethyl ketone-water azeotrope is distilled off in the theoretical amount. After cooling somewhat, 0.2 part of sodium acetate is added to destroy the catalyst and the mass fractionated. The 2-[4-pentenyloxy)methyl]-2-methyl-1,3-propanediol distils at 146° C. at 10 mm. of mercury pressure and has a refractive index $n_D^{25}$ 1.4602. Analysis shows: C=63.9%, H=10.8%, OH #595.

When undecylene bromide having a double bond, C=C, in the terminal position is substituted for the 5-bromo-1-pentene in this example, the corresponding propanediol is produced in substantially the same manner.

EXAMPLE 3

155 parts of pyridine is added slowly to 1000 parts of phosphorus tribromide and 400 parts of benzene in an agitated, cooled vessel. The mass is then cooled to —4° C. and a mixture of 1000 parts of 2-allyloxyethanol (a known compound) and 50 parts of pyridine is added slowly while the temperature is maintained at —4° C. The temperature is then raised slowly over a period of about one hour to 25° C.

The mass is then distilled at 60 mm. of mercury pressure the distillate being collected at 40–120° C. and the pot temperature not being allowed to rise above 180° C. As soon as the distillation is finished the pot is then cooled to below 70° C. and the system brought to atmospheric pressure with nitrogen. Ethyl alcohol is then added slowly to the pot residue to destroy its reactivity. Failure to do this may result in violent decomposition and fire when the pot residue is exposed to the air.

The distillate is washed with 200 parts of dilute sodium hydroxide, then with 200 parts of dilute sulfuric acid and then with 200 parts of water. It is then dried and fractionated under vacuum to yield 951 parts of 2-allyloxy bromoethane boiling at 59–60.5° C. at 23 mm. of mercury pressure. The refractive index at 25° C. is 1.4644.

607 parts of the 2-allyloxybromoethane is added to a duplicate preparation of the sodium salt of the hydroxy ketal over about 24 hours while the reaction mass refluxed at 110 to 103° C. The mass is cooled to 50° C. and 200 parts of water is stirred in. After the layers separate, the toluene layer is removed and dried and fractionally distilled. The allyloxyethyl ketal boils at 147° C. at 11 mm. of mercury pressure. It has a refractive index $n_D^{25}$ 1.4494. It analyzes: C=69.15%, H=10.15%.

270 parts of the allyloxyethoxy ketal (2-methyl-2-ethyl-5-methyl-5 - [2 - allyloxyethoxymethyl] - 1,3 - dioxane) is mixed with 50 parts of water and 0.2 part of p-toluene sulfonic acid and heated to the boil. The mass becomes homogeneous and the theoretical quantity of the resulting methylethyl ketone-water azeotrope is distilled off. The mass is cooled and 0.2 part of sodium acetate is added to neutralize the catalyst. The mass is fractionated, the 2-[2-allyloxyethoxymethyl]-2-methyl-1,3-propane diol boiling at 166° C. at 8 mm. of mercury pressure. It has a refractive index $n_D^{25}$ 1.4638. It analyzes: C=58.9%, H=10.0%, OH #554.

EXAMPLE 4

To a stirred mixture of 290 parts of allyl alcohol and 3.5 parts sulfuric acid is added dropwise 102 parts of 3-methyl-3-oxetanemethanol at 25° C. The mixture is kept overnight at 25° C. and heated one hour at 100° C. A 50% aqueous solution containing 3.5 parts of sodium hydroxide and 2.0 parts glacial acetic acid is added to neutralize the acid. Distillation through a fractionating column gives 65.5 parts of 2-(allyloxymethyl)-2-methyl-1,3-propanediol, boiling at 120–1° C. at 2.8 mm. Analytical data: Found: C=60.1%, 60.2%, H=9.8%, 9.7%, OH #697, 699.

The compound, 3-methyl-3-oxetanemethanol, can be prepared from trimethylolethane as described in French Patent No. 1,122,903.

EXAMPLE 5

Polymeric polyurethanes of each of the propane-1,3-diols of Examples 1, 2 and 3 are prepared as follows: 1 mol of the unsaturated glycol, 2 mols of polytetramethyleneether glycol of molecular weight 1000 and 0.02 mol of allyl alcohol are mixed together. Then 3.05 mols of toluene-2,4-diisocyanate is mixed in and the mass is heated at 90° C. for one hour. It is then cooled to 80° C., poured, under a nitrogen atmosphere, into a polyethylene container, which is then sealed, and heated for 3 days at 80° C.

The resulting polymers are then compounded with curing ingredients on a rubber roll mill and cured in molds in a press at 140° C. The compounding mixes and the test data on the cured elastomers are given in the following table (parts are by weight):

| | A | B | C |
|---|---|---|---|
| Elastomer from propane diol of Example 1 | 100 | | |
| Elastomer from propane diol of Example 2 | | 100 | |
| Elastomer from propane diol of Example 3 | | | 100 |
| High abrasion furnace black | 30 | 30 | 30 |
| Sulfur | 3 | 2 | 2 |
| Benzothiazyl disulfide | 6 | 4 | 4 |
| 2-Mercaptobenzothiazole | 1 | 1 | 1 |
| Zinc p-methoxydithiocarbanilate | 0.4 | 0.4 | 0.4 |
| Hours cure at 140°C | 1 | 1 | 1 |
| Tensile strength at break, 25°C., lbs./sq. in | 5,100 | 4,650 | 5,100 |
| Modulus at 300% elongation, 25°C., lbs./sq. in | 4,000 | 4,350 | 4,400 |
| Elongation at break, percent | 330 | 310 | 320 |
| Hardness, Shore A | 74 | 72 | 75 |
| Heat build-up—Minutes | 20 | 20 | 20 |
| ¼″ stroke—Change in compression (Final low reading) | 73 | 80 | 53 |
| 200 lbs./sq. in.—Temp. of center, °C | 170 | 187 | 203 |
| Goodrich Flexometer—State of pellet at finish | Perfect | Perfect | Perfect |

A similar polymeric polyurethane may be prepared by utilizing the 2-(allyloxymethyl)-2-methyl-1,3-propanediol of Example 4.

In comparison, elastomers made using alpha-allyl glycerol in which one hydroxyl group is secondary show much less resistance to the heat build-up tests, the pellets exploding under the above conditions.

When beta-allyl glycerol, which has two primary hydroxyl groups but in which the allyloxy group is attached to the glycerol carbon chain directly by an ether oxygen, is substituted for the 2-[4-(pentenyloxy)methyl]-2-methyl-1,3-propanediol in "B" above, the heat build-up pellet is seriously damaged under the same test conditions, developing cavities within the pellet.

The zinc p-methoxydithiocarbanilate is prepared as follows:

A solution of 10 parts of p-anisidine in 16 parts of methanol is added slowly to an agitated mixture of 22 parts of concentrated ammonium hydroxide and 7.5 parts of carbon disulfide while the temperature is maintained between 0° C. and 10° C. Stirring at this temperature is continued for 1.5 hours after the addition is complete. A precipitate of ammonium p-methoxydithiocarbanilate is formed. The solid is filtered from the cold solution and washed with 7 parts of ice water. The nearly dry filter cake is dissolved in 380 parts of water and 0.8 part of activated charcoal ("Darco KB") is added and the mass is filtered. To the resulting clear yellow solution is added 6 parts of zinc chloride dissolved in 2.5 parts of water while agitating vigorously and stirred for 30 minutes longer. A white precipitate of zinc p-methoxy dithiocarbanilate forms which is filtered off. The filter cake is washed with water and then dried in a circulating air oven at 50° C. 14 parts of zinc p-methoxy-dithiocarbanilate is obtained.

Many widely different embodiments of this invention may be made without departing from the spirit and scope thereof; it is to be understood that this invention is not limited to the specific embodiments thereof except as defined in the appended claims.

I claim:

1. An unsaturated glycol ether of the formula

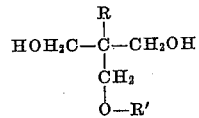

wherein R is a lower alkyl radical, and, R' is taken from the group consisting of an alkyl radical having from 3 to 11 carbon atoms, said radical having a terminal aliphatic —HC=CH$_2$ group, and, the radical

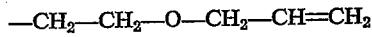

2. The compound

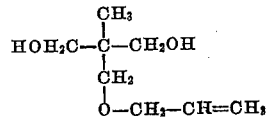

3. The compound

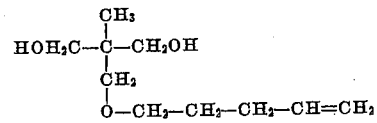

4. The compound

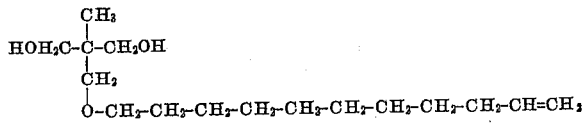

5. The compound

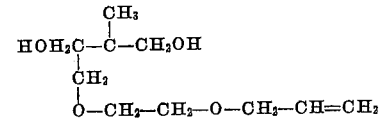

References Cited in the file of this patent

UNITED STATES PATENTS 2,634,296  Morris et al. _____ Apr. 7, 1953

UNITED STATES PATENT OFFICE
CERTIFICATE OF CORRECTION

Patent No. 2,854,486     September 30, 1958

Herbert F. McShane, Jr.

It is hereby certified that error appears in the printed specification of the above numbered patent requiring correction and that the said Letters Patent should read as corrected below.

Column 3, line 68, for "-50 C." read -- $-5°$ C. --; column 6, lines 57 to 61, the compound should appear as shown below instead of as in the patent:

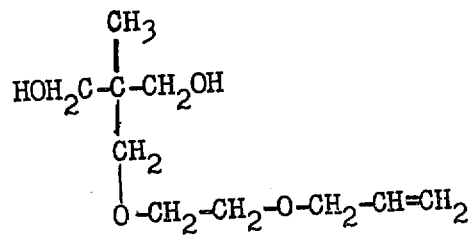

Signed and sealed this 30th day of December 1958.

(SEAL)
Attest:

KARL H. AXLINE

Attesting Officer

ROBERT C. WATSON
Commissioner of Patents